US008504020B2

(12) United States Patent
Gilbert

(10) Patent No.: US 8,504,020 B2
(45) Date of Patent: *Aug. 6, 2013

(54) AIRCRAFT CABIN PERSONAL TELEPHONE MICROCELL

(75) Inventor: David Gilbert, Overland Park, KS (US)

(73) Assignee: Honeywell International Inc., Morristown, NJ (US)

( * ) Notice: Subject to any disclaimer, the term of this patent is extended or adjusted under 35 U.S.C. 154(b) by 640 days.

This patent is subject to a terminal disclaimer.

(21) Appl. No.: 11/874,558

(22) Filed: Oct. 18, 2007

(65) Prior Publication Data

US 2008/0090567 A1    Apr. 17, 2008

Related U.S. Application Data

(63) Continuation of application No. 11/493,720, filed on Jul. 26, 2006, which is a continuation of application No. 09/665,178, filed on Sep. 19, 2000, now Pat. No. 7,162,235.

(60) Provisional application No. 60/157,897, filed on Oct. 5, 1999.

(51) Int. Cl.
| *H04W 4/00* | (2009.01) |
| *H04B 1/00* | (2006.01) |
| *H04B 17/00* | (2006.01) |
| *H04B 1/04* | (2006.01) |
| *H04B 7/00* | (2006.01) |
| *H04W 36/00* | (2009.01) |
| *G08B 21/00* | (2006.01) |

(52) U.S. Cl.
USPC .......... 455/431; 435/11.1; 435/300; 340/945; 455/63.1; 455/67.13; 455/427; 455/126; 455/430; 455/524; 455/436; 455/445

(58) Field of Classification Search
USPC ................... 455/431, 11.1; 340/945
See application file for complete search history.

(56) References Cited

U.S. PATENT DOCUMENTS

| 4,737,771 A | 4/1988 | Coash |
| 4,825,457 A | 4/1989 | Lebowitz |
| 5,445,347 A | 8/1995 | Ng |
| 5,519,761 A * | 5/1996 | Gilhousen ..................... 455/431 |
| 5,524,272 A | 6/1996 | Podowski |

(Continued)

FOREIGN PATENT DOCUMENTS

JP           11064484           3/1999

OTHER PUBLICATIONS

Sreetharan et al., "Wireless Technologies With Data Capability", "Cellular Digital Packet Data", 1996, pp. 15-24, Publisher: Artech House, Inc, Published in: Norwood, MA.

*Primary Examiner* — Timothy Pham
(74) *Attorney, Agent, or Firm* — Fogg & Powers LLC

(57) ABSTRACT

An on-board base station, comprising an interface device on board an aircraft that interfaces with a separate wireless device of a user inside the aircraft and with a wireless bearer system, an RF detector that detects RF emissions of the separate wireless device, a controller coupled to the RF detector, that controls RF emissions of the separate wireless device, as a function of detected RF emissions, and an RF repeater communicatively coupled to the controller. The controller controls the RF repeater to receive and send signals between the antenna and the interface device to maintain the RF emissions below a predetermined level.

16 Claims, 3 Drawing Sheets

U.S. PATENT DOCUMENTS

| | | | |
|---|---|---|---|
| 5,732,334 A | | 3/1998 | Miyake |
| 5,887,258 A | | 3/1999 | Lemozit et al. |
| 5,950,129 A | * | 9/1999 | Schmid et al. ............... 455/431 |
| 5,970,395 A | * | 10/1999 | Weiler et al. ............... 455/67.13 |
| 5,995,833 A | | 11/1999 | Zicker |
| 6,032,057 A | * | 2/2000 | Kiiski ........................... 455/446 |
| 6,047,165 A | | 4/2000 | Wright et al. |
| 6,092,008 A | | 7/2000 | Bateman |
| 6,108,539 A | | 8/2000 | Ray et al. |
| 6,154,637 A | | 11/2000 | Wright et al. |
| 6,181,990 B1 | | 1/2001 | Grabowsky et al. |
| 6,201,797 B1 | | 3/2001 | Leuca et al. |
| 6,249,913 B1 | | 6/2001 | Galipeau et al. |
| 6,269,243 B1 | | 7/2001 | Corbefin et al. |
| 6,285,878 B1 | | 9/2001 | Lai |
| 6,314,286 B1 | | 11/2001 | Zicker |
| 6,324,398 B1 | | 11/2001 | Lanzerotti et al. |
| 6,393,281 B1 | | 5/2002 | Capone et al. |
| 6,477,152 B1 | | 11/2002 | Hiett |
| 6,499,027 B1 | | 12/2002 | Weinberger |
| 6,711,150 B1 | | 3/2004 | Vanghi |
| 6,741,841 B1 | * | 5/2004 | Mitchell ................... 455/188.1 |
| 6,751,442 B1 | | 6/2004 | Barrett |
| 6,757,712 B1 | | 6/2004 | Bastian et al. |
| 6,795,408 B1 | | 9/2004 | Hiett |
| 7,162,235 B1 | | 1/2007 | Gilbert |

* cited by examiner

AIRCRAFT CABIN PERSONAL TELEPHONE MICROCELL

CROSS-REFERENCE TO RELATED APPLICATION

This application is a continuation of U.S. patent application Ser. No. 11/493,720 filed on Jul. 26, 2006 (pending), which is a continuation of U.S. patent application Ser. No. 09/665,178 filed on Sep. 19, 2000 (issued), which claims the benefit of provisional application No. 60/157,897, filed Oct. 5, 1999, which applications are incorporated herein by reference.

BACKGROUND OF THE INVENTION

1. Field of the Invention

The present invention relates to mobile telecommunications. More particularly, the present invention relates to a system and method for two-way telecommunications using a wireless telephone on an aircraft, and even more particularly on an aircraft that is maneuvering under its own power, i.e., is taxiing on the runway or is in flight.

2. Description of the Related Art

Current airline practice is to allow normal personal cellphone use only while the aircraft is at the gate and the doors are open. The use of personal wireless phones while on-board a maneuvering aircraft is typically prohibited because the radio frequency (RF) emissions from the wireless phone can interfere with the aircraft's systems, for example, communication systems, navigation systems, etc. Additionally, an aircraft in flight provides an on-board cellular terminal user with line of site to many cellphone base stations simultaneously, which may overload or interfere with the ground networks if the cellphone simultaneously transmits signals to several base stations.

Conventional air-to-ground telecommunication systems, such as the Claircom AT&T Wireless system and the GTE Airfone system used on board many commercial airliners in the USA and satellite communications systems used on some international airliners, require a passenger to use a telephone installed in the seatback or armrest of the aircraft to initiate a telephone call. The seatback phone connects the aircraft passenger to a ground-based radio station which in turn connects to the public switched telephone network (PSTN). The PSTN is the everyday telephone network (local and long distance) infrastructure operated by telephone carriers, such as AT&T, MCI, Sprint, etc. However, the passengers are still prohibited from using the personal phone to which they are accustomed, depriving them of their normal service subscriptions and also their personal phone's features, such as speed dial and personal phone book. The passenger also pays higher access fees to use the seatback phone installed in the aircraft, and it is very cumbersome, or in some cases impossible, to receive incoming calls on the seatback phones, resulting in passengers being unable to receive calls at all during the flight.

There is a need, therefore, for an improved telecommunication system that will allow the use of a personal wireless telephone while on board a maneuvering aircraft.

SUMMARY OF THE INVENTION

It is a general object of the present invention to provide a system and method for two-way telecommunications using a personal, wireless telephone on board a maneuvering aircraft.

It is another object of the present invention to provide a system and method for two-way telecommunications on board a maneuvering aircraft that allows a user to initiate and receive calls from a personal, wireless telephone.

In accordance with the objects described above, one aspect of the present invention includes a telecommunication system having an interface device on board an aircraft that interfaces with a wireless phone of a user inside the aircraft and with a wireless bearer system, and a controller that controls the interface device to maintain RF emissions of the wireless phone below a predetermined level. The interface device receives signals from and transmits signals to the wireless phone, receives signals from and transmitting signals to the wireless bearer system, and interfaces through the wireless bearer system to a cellular network and then with a public switched telephone network to register the wireless phone as a roaming subscriber on the contacted cellular network. The predetermined level is a level above which RF emissions will interfere with aircraft systems. The telecommunication system may also include one or more of a wireless bearer system gateway on board the aircraft that converts signals received from the wireless phone to protocols of the wireless bearer system and that converts signals received from the wireless bearer system to protocols of the wireless phone, an antenna in a cabin of the aircraft that receives output signals from the wireless phone and conveys the output signals to the interface device, a media converter that conveys the signals between the antenna and the interface device, an RF detector that detects unwanted RF emissions above the predetermined level and unsupported cellphone types where the controller alerts crew members of the aircraft to the unwanted RF emissions and unsupported cellphone types detected by the RF detector, and an external antenna that respectively transmits and receives direct cellular signals to and from the wireless phone when the aircraft is on the ground.

In another aspect of the present invention, a telecommunication system includes means on board an aircraft for interfacing with a wireless phone of a user inside the aircraft and with a wireless bearer system, and means for controlling RF emissions of the wireless phone to maintain the RF emissions below a predetermined level above which RF emissions will interfere with aircraft systems. The means for interfacing is for receiving signals from and transmitting signals to the wireless phone, for receiving signals from and transmitting signals to the wireless bearer system, and for interfacing through the wireless bearer system to a cellular network and then with a public switched telephone network to register the wireless phone as a roaming subscriber on the contacted cellular network. The telecommunication system may also include one or more of means on board the aircraft for converting signals received from the wireless phone to protocols of the wireless bearer system and for converting signals received from the wireless bearer system to protocols of the wireless phone, means for detecting unwanted RF emissions above the predetermined level and unsupported cellphone types where the means for controlling alerts crew members of the aircraft to the unwanted RF emissions and unsupported cellphone types detected by the means for detecting, and means for respectively transmitting and receiving direct cellular signals to and from the wireless phone when the aircraft is on the ground.

In yet another aspect of the present invention, a method of two-way communications using a wireless phone on board an aircraft includes the steps of interfacing on board the aircraft with the wireless phone of a user inside the aircraft and with a wireless bearer system, and controlling RF emissions of the wireless phone to maintain the RF emissions below a predetermined level above which RF emissions will interfere with aircraft systems. The interfacing step includes receiving signals from and transmitting signals to the wireless phone, receiving signals from and transmitting signals to the wireless bearer system, and interfacing through the wireless bearer system to a cellular network and then with a public switched telephone network to register the wireless phone as a roaming subscriber on the contacted cellular network. The method may also include one or more of converting signals received from the wireless phone to protocols of the wireless bearer system and converting signals received from the wireless bearer system to protocols of the wireless phone, detecting unwanted RF emissions above the predetermined level and unsupported cellphone types where the controlling step includes alerting crew members of the aircraft to the unwanted RF emissions and unsupported cellphone types detected in the detecting step, and transmitting and receiving direct cellular signals to and from the wireless phone when the aircraft is on the ground.

In still another aspect of the present invention, computer executable code for implementing a method of two-way communications using a wireless phone on board an aircraft includes code for executing the steps of interfacing on board the aircraft with a wireless phone of a user inside the aircraft and with a wireless bearer system, and controlling RF emissions of the wireless phone to maintain the RF emissions below a predetermined level above which RF emissions will interfere with aircraft systems. The interfacing step includes receiving signals from and transmitting signals to the wireless phone, receiving signals from and transmitting signals to the wireless bearer system, and interfacing through the wireless bearer system with a cellular network and then with a public switched telephone network to register the wireless phone as a roaming subscriber on the contacted cellular network. The computer executable code may also include code for executing one or more of converting signals received from the wireless phone to protocols of the wireless bearer system and converting signals received from the wireless bearer system to protocols of the wireless phone, detecting unwanted RF emissions above the predetermined level and unsupported cellphone types where the controlling step includes alerting crew members of the aircraft to the unwanted RF emissions and unsupported cellphone types detected in the detecting step, and transmitting and receiving direct cellular signals to and from the wireless phone when the aircraft is on the ground.

In another aspect of the present invention, a method of two-way communications using a wireless phone on board an aircraft includes the steps of providing a base station on the aircraft to receive outbound signals from the wireless phone, and transmitting the outbound signals from the aircraft to a wireless bearer system for communication to a ground earth station. The method may also include one or more of receiving, by the base station, inbound signals from the wireless bearer system, transmitting the inbound signals from the base station to the wireless phone, interfacing, through the wireless bearer system, the base station with a cellular network and then with a public switched telephone network to register the wireless phone as a roaming subscriber on the contacted cellular network, controlling RF emissions of the wireless phone to maintain the RF emissions below a predetermined level above which RF emissions will interfere with aircraft systems, converting signals received from the wireless phone to protocols of the wireless bearer system and converting signals received from the wireless bearer system to protocols of the wireless phone, detecting unwanted RF emissions above the predetermined level and unsupported cellphone types where the controlling step includes alerting crew members of the aircraft to the unwanted RF emissions and unsupported cellphone types detected in the detecting step, and transmitting and receiving direct cellular signals to and from the wireless phone when the aircraft is on the ground.

These and other aspects, objects, and features of the present invention will become apparent from the following detailed description of the preferred embodiments, read in conjunction with, and reference to, the accompanying drawings.

DETAILED DESCRIPTION OF THE PREFERRED EMBODIMENTS

While the present invention applies to all personal, wireless phone use on-board an aircraft, it is particularly beneficial for use in flight, because it provides a system and method for passengers to use a personal, wireless phone to initiate and receive calls on board a maneuvering aircraft. In doing so, the present invention includes an on-board base station that interfaces between the passenger's personal phone and a Satellite Communications (SATCOM) system, thereby connecting the personal phone to the PSTN. The present invention also controls the output of the personal phone below an acceptable level, thereby preventing interference with the aircraft's systems.

A SATCOM system refers to the method of making a communications transfer by transmitting between a ground or aircraft-based mobile satellite terminal and a satellite vehicle in space. The communications signal is transferred between the satellite and a fixed ground station and between the ground station and the public voice and data networks.

Figure 1:
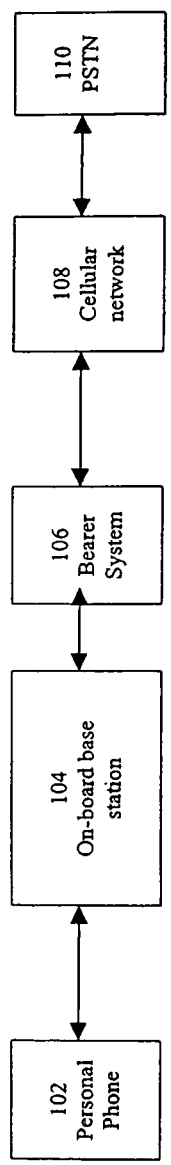
FIG. 1 is a block diagram showing the telecommunication system according to the present invention.
Figure 2:
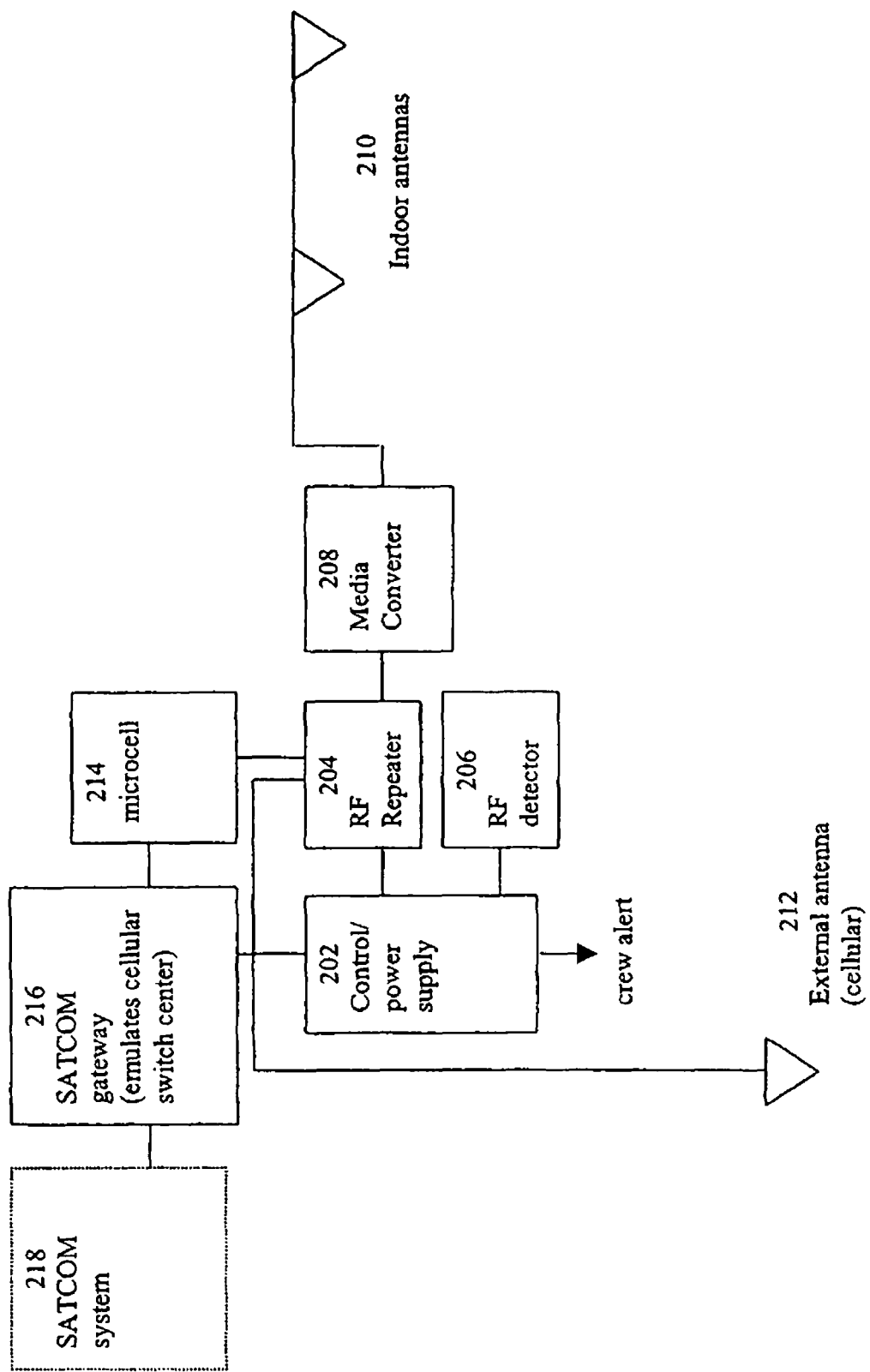
FIG. 2 is a block diagram showing an embodiment of the telecommunication system according to the present invention.
Figure 3:
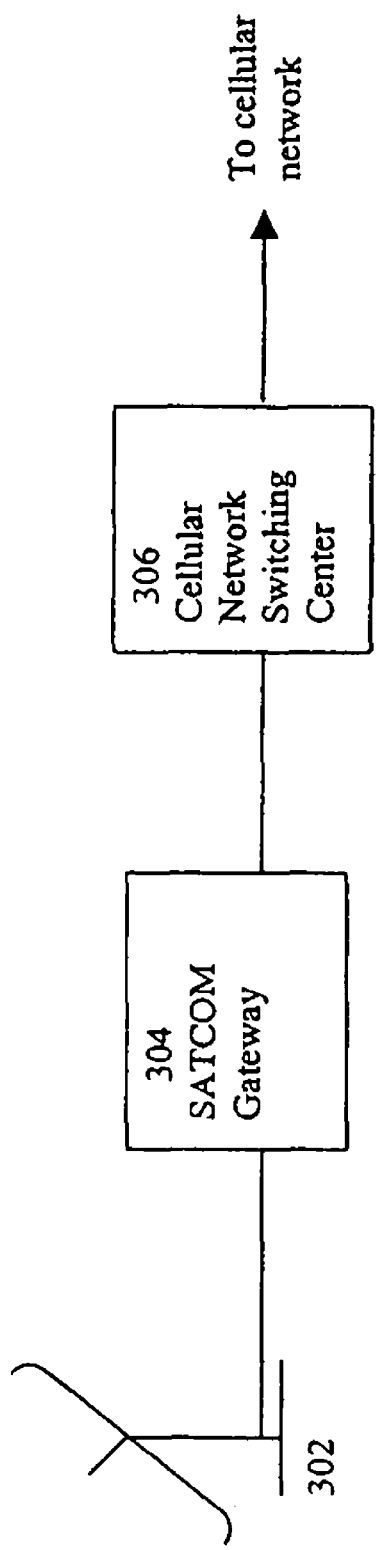
FIG. 3 is a block diagram showing a ground earth station that operates with the telecommunication system of the present invention.

Each of the elements shown in block outline in FIG. 1, as well as in FIGS. 2 and 3, is well known per se, and a specific type of construction is not critical to carrying out the invention or to a disclosure of the best mode for carrying out the invention.

As shown in FIG. 1, the system according to the present invention includes a cellular base station (including an interface device, for example, a microcell or picocell) 104 installed on the aircraft. The base station 104 interfaces the personal, wireless phones 102 of the passengers in the aircraft's cabin with a wireless bearer system 106. The wireless bearer system 106 completes the call to or from the cellular network 108, which connects to the public switched telephone network (PSTN) 110.

In operation, the on-board base station 104, in conjunction with its computer controller (described below), interfaces with the personal phones 102 to control their power level and RF emissions and to transmit and receive signals to and from the personal phones. The on-board base station 104 also interfaces with the PSTN 110 through the wireless bearer system 106 to register the personal phones as normal roaming subscribers and to complete calls to or from the personal phones. A roaming subscriber is someone who is using a cellphone outside their normal home area and within an area serviced by a cellular service provider which is not the one with whom the subscriber has his agreement and to whom he pays charges.

The home network operators typically have roaming agreements with other network operators to provide service to customers outside their home area.

The on-board base station of the present invention includes a personal wireless phone base station, for example, a microcell or picocell (described in detail below), modified to operate in the aeronautical environment. The wireless phone base station is a radio transceiver that can communicate using wireless RF radiation with user terminals within its local, limited area, i.e., it transmits RF signals to and receives RF signals from the user terminals. It may also encapsulate additional functions, such as time synchronization with user terminals, signal decoding and encoding, and transmission rate adaptation between a terminal interface (for example, a wireless phone), and it may also provide a beacon signal for user terminals to be able to link to the base station.

Modifications to the wireless base station are necessary to make the unit rugged enough to operate in the physical environment of an airplane, i.e., so that it will meet the performance requirements in an environment of vibration, altitude temperature, power fluctuations, etc. Typical modifications to standard commercial electronic systems for installation on an aircraft may include: 1) Additional provisions for shock mounting of components to avoid vibration and gravitational forces dislodging or disconnecting them during aircraft operation; 2) Replacement or substitution of electronic components to provide more reliable operation and less susceptibility to changes in pressure, temperature, or power fluctuations; 3) Provision of additional heating and/or cooling mechanisms (fans, changed airflow, heatsinks, temperature-sensitive air heaters, etc.); 4) Replacement of components and/or provision of tighter case seals, use of different sealing materials, or replacement of cables and connectors in order to a) reduce emitted and conducted radiation which could interfere with, or be susceptible to, radiation from other electronic systems on board the aircraft, b) provide waterproofing where the equipment may be subjected to liquid spills, c) reduce flammability to required airworthiness standards, and d) avoid the production of harmful gases if the equipment is subjected to fire; 5) Replacement of power supply components in order to meet aircraft supply characteristics of either 28V DC or 115V AC at 400 Hertz as provided on board commercial and business aircraft; and (6) Uprating the power supply.

Additionally, the on-board base station is programmed to control the power level of the personal phones so that radiated emissions remain lower than a predetermined level, thereby controlling the probability of interfering with aircraft systems. The predetermined level corresponds to levels of acceptable emissions within aircraft, which are specified in Radio Technical Commission for Aeronautics, Inc. (RTCA) document DO-160D and vary for different aircraft operating conditions, aircraft types, and frequencies within the RF spectrum. The disclosure of RTCA document DO-160D is hereby incorporated by reference. The present invention controls emissions within the requirements in that document and also detects radiated emissions outside the acceptable limits.

An embodiment of the present invention illustrating details of the on-board base station 104 will be described with reference to FIG. 2. An indoor antenna, or antennas, 210 in the aircraft's cabin receives signals from and transmits signals to personal phones of the passengers. The antenna is an internal, in-building type antenna, such as a conventional antenna used in a tunnel, cabled directly to a base station, and therefore does not require line-of-sight-detection from the subscriber's terminal to the wireless base station. A media converter 208, such as a coaxial cable, fiber optic cable, or the like, relays the signals between the antenna 210 and an RF repeater 204. A controller 202, including a power supply, controls the RF repeater to receive and send the signals between the antenna 210 and a microcell 214, and it performs a control function that causes the microcell 214 to minimize RF emissions from personal phones in the cabin and to maintain the power output at reasonable levels to avoid interference. The controller 202 is a computer programmed to perform the functions discussed above or to run software designed to perform those functions. Alternatively, the controller could be a digital or analog circuit that performs those functions. An RF detector 206 detects unwanted RF emissions and unsupported cellphone types and reports to the controller 202, which alerts crew members to their presence.

In this embodiment, signals between the aircraft and the ground are transmitted using a SATCOM system 218 as the wireless bearer system 106 (FIG. 1). A SATCOM gateway 216 on board the aircraft interfaces the SATCOM system 218 with the microcell 214. An external antenna 212 also allows direct cellular communications when RF emissions from personal phones are not hazardous to the flight, for example, when the aircraft is on the ground and is not moving under its own power. Direct cellular communications are communications direct from the user handset to a ground base station of a nearby cellular network using wireless transmission without the necessity of using the on-board microcell.

As shown in FIG. 3, the relevant satellite ground earth stations for completing calls with the telecommunication system in the aircraft include a satellite 302, that receives signals from and transmits signals to the SATCOM system 218 (FIG. 2), and a SATCOM gateway 304 that converts the signals to the correct protocols for communication between the Cellular Network Switching Center 306 and the SATCOM system 218. The signals are then transmitted to the appropriate cellular network(s). The cellular network determines the appropriate routing for the call and is connected to the PSTN, thus allowing a cellular subscriber to make calls to a fixed telephone and vice versa.

In the ground system, the ground earth station communicates with the base station on the airplane via satellite through the SATCOM system. The SATCOM system provides a path for multiple cellular channels to be transmitted and received by the airplane. The SATCOM gateway on the ground emulates a base station to the cellular network and its switching center and converts between SATCOM protocols and the cellular network protocols of the switching center.

The gateway system of the ground earth station appears to one or more connected cellular networks as a standard base station operating as part of the relevant cellular network. It therefore converts the SATCOM protocols into cellular protocols and vice versa. The standard link between a base station and the nearest network switch center is usually implemented with a CEPT E1 or T1 digital link carrying multiplexed voice and data traffic. Voice traffic on the SATCOM bearer system is de-multiplexed, if necessary, and converted from the compressed forms used for SATCOM voice traffic to the protocols used within the cellular networks. The reverse procedure is required for voice traffic originating on the ground cellular network side of the SATCOM gateway.

The present invention meets the need for passengers to keep in touch while traveling. The on-board base station keeps their personal phones connected to the ground network as normal roaming subscribers, and the passengers can send and receive calls just like any other cellular roaming subscriber. Additionally, the passengers can use the personal phone to which they are accustomed, thereby allowing them to have full access to their phone's features, such as speed dial, phone books, voice mail, text messaging, etc. The system allows the use of personal cell phones on board an operating aircraft by controlling their RF outputs to acceptable levels and by using antennas in the aircraft's cabin to receive signals from and transmit signals to the personal phones.

The present invention is especially useful when operating outside cellular partners' networks, because it uses a SATCOM system to communicate the signals to and from the ground. It is also appropriate for international applications.

A method according to the present invention for providing two-way telecommunications using a personal, wireless phone on board an aircraft includes the steps of providing a base station on the aircraft to receive outbound signals from the wireless phone, and transmitting the outbound signals from the aircraft to a wireless bearer system for communication to a ground earth station. The base station may control RF emissions of the personal phone to maintain the RF emissions below an acceptable level. The method may also include the steps of the base station receiving inbound signals from the wireless bearer system and transmitting the inbound signals to the wireless phone, and converting the output signals to protocols of the wireless bearer system prior to transmitting the output signals to the wireless bearer system and converting the input signals from the wireless bearer system protocols prior to transmitting the input signals to the personal phones on the aircraft.

It is preferable to use the present invention with computer hardware that performs the processing functions. As will be appreciated by those skilled in the art, the systems, methods, and procedures described herein can be embodied in a programmable computer, computer executable software, or digital circuitry. The software can be stored on computer readable media, for example, on a floppy disk, RAM, ROM, a hard disk, removable media, flash memory, memory sticks, optical media, magneto-optical media, CD-ROMs, etc. The digital circuitry can include integrated circuits, gate arrays, building block logic, field programmable gate arrays (FPGA), etc.

Although specific embodiments of the present invention have been described above in detail, it will be understood that this description is merely for purposes of illustration. Various modifications of, and equivalent steps corresponding to, the disclosed aspects of the preferred embodiments, in addition to those described above, may be made by those skilled in the art without departing from the spirit of the present invention defined in the following claims, the scope of which is to be accorded the broadest interpretation so as to encompass such modifications and equivalent structures.

I claim:

1. An on-board base station, comprising:
    an interface device on board an aircraft that interfaces with a separate wireless device of a user inside the aircraft and with a wireless bearer system, the wireless bearer system communicatively coupling the separate wireless device to an external public network;
    a radio frequency (RF) detector that detects RF emissions of the separate wireless device;
    an air-to-ground gateway on board the aircraft that converts signals received from the wireless device to protocols of an air-to-ground system and that converts signals received from the air-to-ground system to protocols of the wireless device, wherein the air-to-ground gateway emulates a cellular switch center;
    a controller coupled to the RF detector, that controls RF emissions of the separate wireless device, as a function of detected RF emissions; and
    an RF repeater communicatively coupled to the controller, wherein the controller controls the RF repeater to receive and send signals between the antenna and the interface device to maintain the RF emissions below a predetermined level, wherein said interface device receives signals from and transmits signals to the wireless device, receives signals from and transmits signals to the air-to-ground system, and interfaces through the air-to-ground system to a cellular network to register the wireless device.

2. The on-board base station of claim 1, wherein the interface device includes a microcell communicatively coupled to the RF repeater.

3. The on-board base station of claim 1, wherein the predetermined level is a level above which RF emissions interfere with aircraft systems.

4. The on-board base station of claim 1, further comprising an antenna in a cabin of the aircraft that receives output signals from the separate wireless device and conveys the output signals to said interface device.

5. The on-board base station of claim 4, further comprising a media converter that conveys the signals between said antenna and said RF repeater.

6. The on-board base station of claim 4, further comprising a media converter that conveys the signals between said antenna and said interface device.

7. The on-board base station of claim 1, wherein the wireless device comprises a cellular device.

8. The on-board base station of claim 1, further comprising:
    an external antenna that respectively transmits and receives direct cellular signals to and from the wireless device when the aircraft is on the ground.

9. The on-board base station of claim 1, wherein the air-to-ground system is a satellite communications (SATCOM) system and wherein the air-to-ground gateway is a SATCOM gateway.

10. An on-board base station, comprising:
    means on board an aircraft for interfacing with a separate wireless device of a user inside the aircraft and with a wireless bearer system, the wireless bearer system communicatively coupling the separate wireless device to an external public network;
    means for controlling radio frequency (RF) emissions of the separate wireless device to maintain the RF emissions below a predetermined level, the predetermined level being a level above which RF emissions will interfere with aircraft systems, wherein said means for interfacing receives signals from and transmits signals to the separate wireless device and receives signals from and transmits signals to the wireless bearer system, wherein said means for interfacing includes an air-to-ground gateway on board the aircraft that converts signals received from the separate wireless device to protocols of an air-to-ground system and that converts signals received from the air-to-ground system to protocols of the separate wireless device, wherein said means for interfacing receives signals from and transmits signals to the air-to-ground system, and interfaces through the air-to-ground system to a cellular network to register the separate wireless device, wherein the air-to-ground gateway emulates a cellular switch center;
    means for repeating communicatively coupled to said means for controlling and to said means for interfacing; and
    means for detecting unwanted RF emissions above the predetermined level and unsupported cellphone types, wherein said means for interfacing minimizes the RF emission from the separate wireless device.

11. The on-board base station of claim 10, wherein said means for controlling alerts crew members of the aircraft to the unwanted RF emissions and unsupported cellphone types detected by said means for detecting.

12. The on-board base station of claim 10, wherein the wireless bearer system is a satellite communications (SATCOM) system, and wherein said means for interfacing also interfaces through the SATCOM system to the cellular network and then with a public switched telephone network to register the separate wireless device as a roaming subscriber on the contacted cellular network.

13. An on-board base station implemented method of two-way communications using separate wireless devices on board an aircraft, said method comprising the steps of:
 interfacing on board the aircraft with the separate wireless devise of users inside the aircraft and with a wireless bearer system, the wireless bearer system communicatively coupling the separate wireless device to an external public network;
 converting signals received from the wireless device to protocols of the satellite communications (SATCOM) system in an air-to-ground gateway on board the aircraft;
 converting signals received from the SATCOM system to protocols of the wireless device in the air-to-ground gateway on board the aircraft, wherein the air-to-ground gateway emulates a cellular switch center;
 controlling a radio frequency (RF) repeater to receive and send signals between an antenna and a microcell;
 detecting RF emissions from the separate wireless devices above a predetermined level; and
 controlling RF emissions of the separate wireless devices as a function of the detected RF emissions to maintain the RF emissions below a predetermined level, wherein an interface device receives signals from and transmits signals to the separate wireless device, receives signals from and transmits signals to an air-to-ground system, and interfaces through the air-to-ground system to a cellular network to register the separate wireless device.

14. The method according to claim 13, wherein the predetermined level is a level above which RF emissions may interfere with aircraft systems.

15. The method of claim 13, wherein interfacing with a wireless bearer system comprises transmitting between an aircraft-based mobile satellite terminal and a satellite vehicle in space.

16. The method of claim 13, wherein interfacing with a wireless bearer system comprises transmitting between a ground mobile satellite terminal and a satellite vehicle in space.

* * * * *